United States Patent [19]

Crocker

[11] 4,039,783
[45] Aug. 2, 1977

[54] SOLID STATE STEP TRANSMITTER

[75] Inventor: Leon Bardin Crocker, Virginia Beach, Va.

[73] Assignee: The United States of America as represented by the Secretary of the Navy, Washington, D.C.

[21] Appl. No.: 681,665

[22] Filed: Apr. 29, 1976

[51] Int. Cl.² .............................. G06F 15/20
[52] U.S. Cl. .................. 235/150.3; 235/150.27; 328/55; 363/10
[58] Field of Search .............. 235/150.3, 150.27; 307/262; 321/7, 52, 60, 61; 323/101; 328/15, 34, 39, 55, 140

[56] References Cited

U.S. PATENT DOCUMENTS

| 3,381,137 | 4/1968 | Brown | 321/7 X |
| 3,527,995 | 9/1970 | Lee et al. | 321/7 |
| 3,573,600 | 4/1971 | Carlisle | 321/7 |
| 3,671,872 | 6/1972 | Pauly | 328/55 |
| 3,753,126 | 8/1973 | Hines et al. | 328/55 X |

Primary Examiner—Jerry Smith

[57] ABSTRACT

The Solid State Step Transmitter converts a low level asymmetrical square-wave voltage into a high level three-phase asymmetrical square-wave voltage, which is completely isolated from the input voltage and is one twenty-fourth of the input frequency. The output also has a positive and negative phase rotation selection.

4 Claims, 5 Drawing Figures

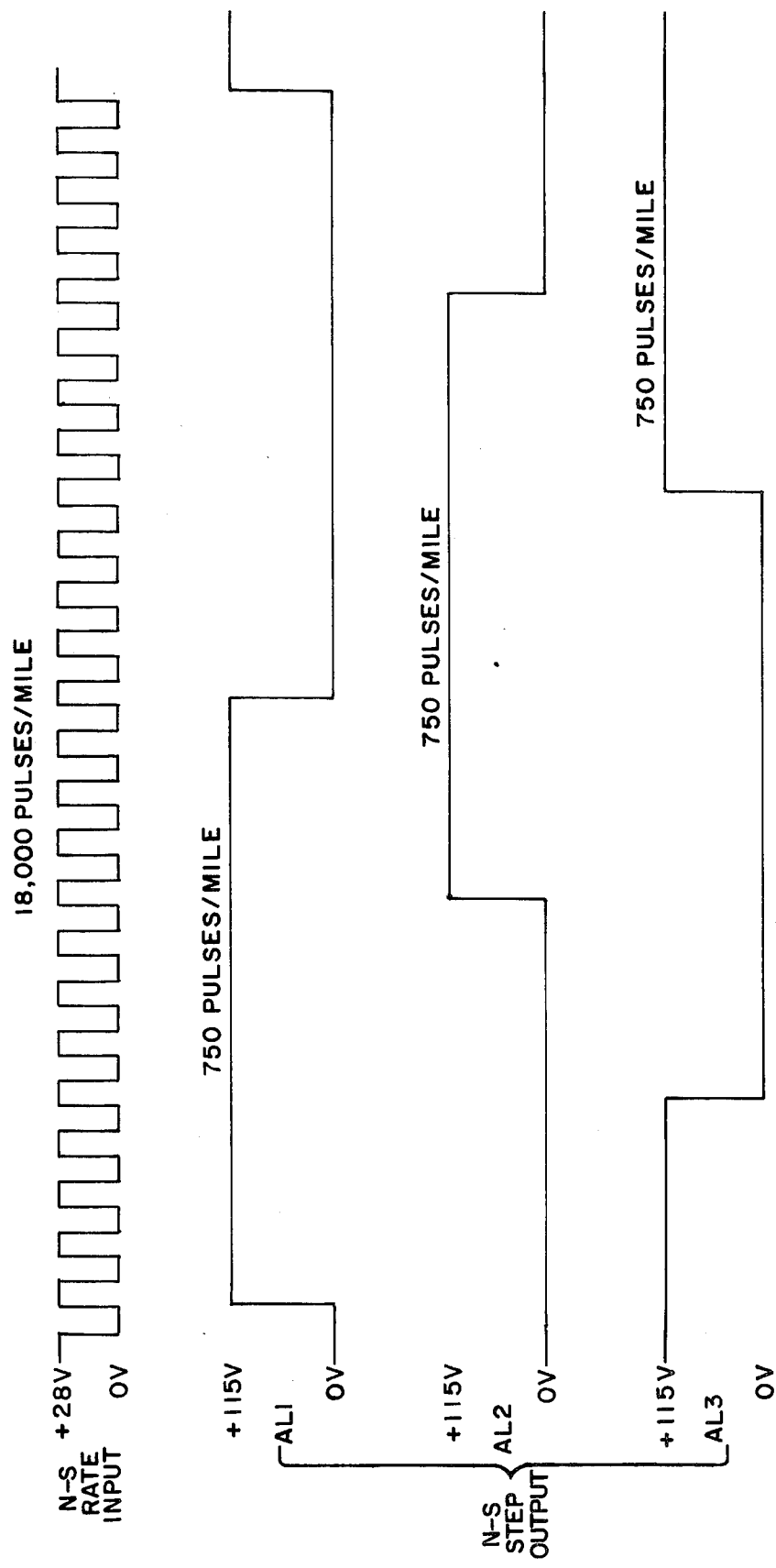

SOLID STATE STEP TRANSMITTER

BACKGROUND OF THE INVENTION

Prior to the Solid State Step Transmitter, conversion of a low level asymmetrical square-wave voltage into a high level three phase asymmetrical square-wave voltage was accomplished by a stepping motor driving an off-center cam which in succession would make or break connections with electrical contacts to provide the three-phase conversion and divider action.

SUMMARY OF THE INVENTION

The Solid State Step Transmitter converts two single-phase digital data pulse trains representing distance traveled into two three-phase digital electrical signals (again, representing distance traveled) compatible for use by external equipment such as Dead Reckoning Tracers (DRT's).

The SSST is divided into two separate, independent and identical channels — one representing north-south distance traveled and the other representing east-west distance traveled. The SSST accepts a N-S Rate signal, a N-S Direction Control signal, an E-W Rate signal and an E-W Direction Control signal, along with 115VDC and 28VDC inputs. Utilizing these inputs, the SSST generates a N-S Step Output and an E-W Step Output. Each Step Output is three 115V peak to peak square wave signals displaced by 120° with respect to each other. Each of these three square wave signals has a variable frequency weighted at 750 pulses/nautical mile.

STATEMENT OF THE OBJECTS OF THE INVENTION

An object of this invention is to eliminate adjustments and deterioration through parts wear of a step transmitter.

Another object of this invention is to provide high reliability and elimination of switching error.

Other objects, advantages and novel features of the invention will become apparent from the following detailed description of the invention when considered in conjunction with the accompanying drawings.

BRIEF DESCRIPTION OF THE DRAWINGS

FIG. 2 comprising

FIG. 4 is an input/output data timing sequence diagram.

DETAILED DESCRIPTION OF THE INVENTION

The Solid State Step Transmitter converts two single-phase digital data pulse trains representing distance traveled into two three-phase digital electrical signals, again representing distance traveled. The phasor relationship is internally generated from only one input signal, a pulse train. The output is relatively high powered as compared to the input signal. Input is zero volts sinking 2 milliamps for a logic zero and 5 volts sourcing 30 microamps for a logic one. The output is a zero to 115 volts three phase pulse train of zero to kilohertz range at 3 amps per phase.

Figure 1:
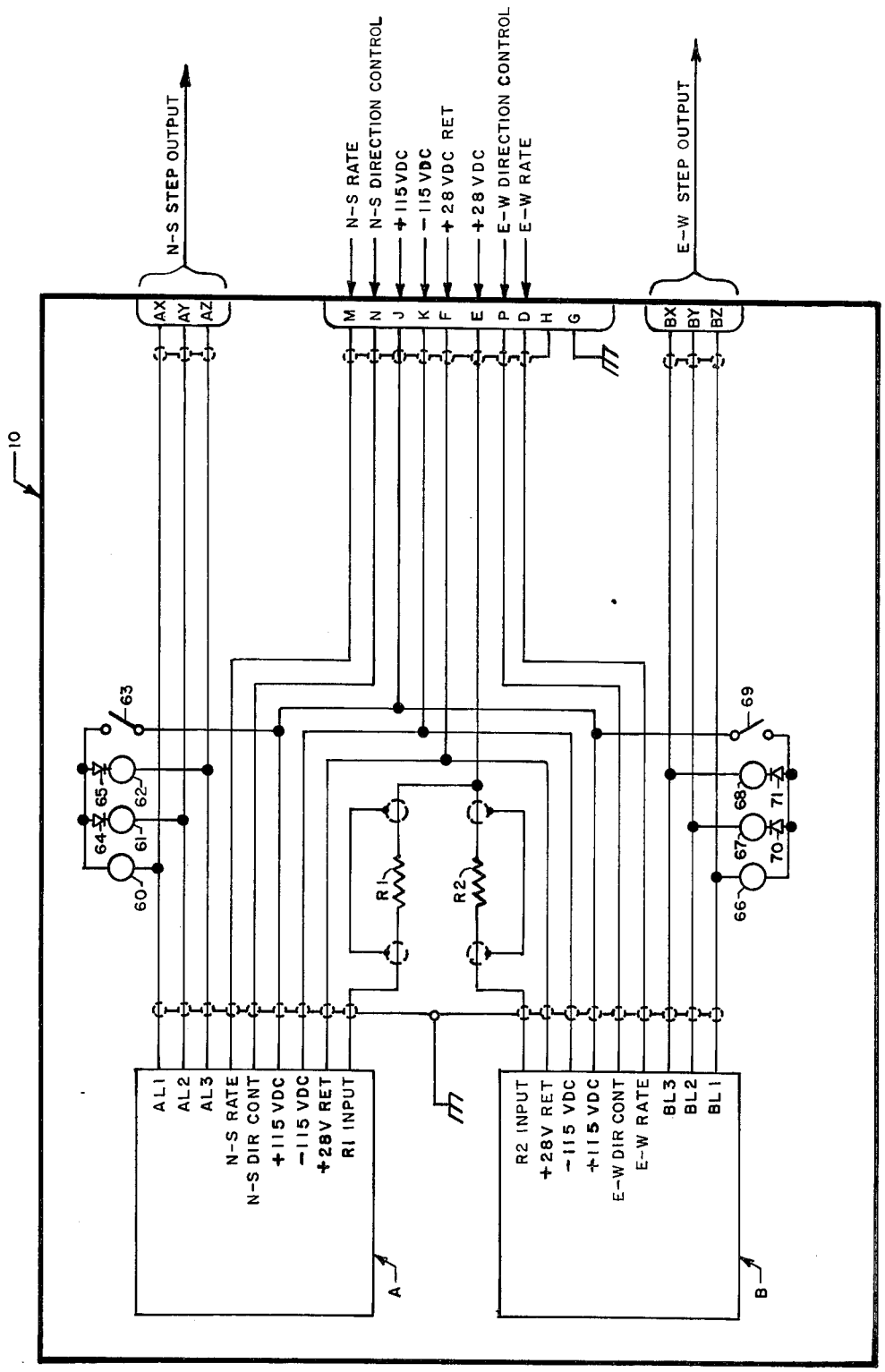
FIG. 1 is a schematic diagram of the Solid State Step Transmitter.

Referring to FIG. 1, the SSST 10 is divided into two separate, independent and identical channels: channel A represents the north-south distance traveled and channel B represents the east-west distance traveled. Since the operation of the channels is identical, the following description refers to the north-south channel A, but the description is equally applicable to the east-west channel B.

The SSST 10 accepts a N-S Rate signal and a N-S Direction Control signal from a Distance N-S Assembly. The N-S Rate signal is a 28V pulse train representing north or south distance traveled. The variable frequency of this pulse train is weighted such that 18,000 pulses equals 1 nautical mile. The N-S Direction Control signal is a "two-state" signal which is +28VDC for distance traveled in a north direction and 0VDC for distance traveled in a south direction. The E-W Direction Control signal is +28VDC for distance traveled in an east direction and 0VDC for distance traveled in a west direction.

FIG. 1 also indicates that the SSST 10 accepts 115VDC and 28VDC inputs. These inputs are used to develop the necessary reference voltages required to operate the SSST 10. The resistors R1 and R2 are each 100 ohm, 10 watt.

In the description of the drawing, specific values are given for resistors and capacitors, and the flip flops, logic gates, transistors and diodes are identified. This is done to better enable one to understand the invention and these specific identifications are not to be construed as limitations on the invention.

Figure 2A:
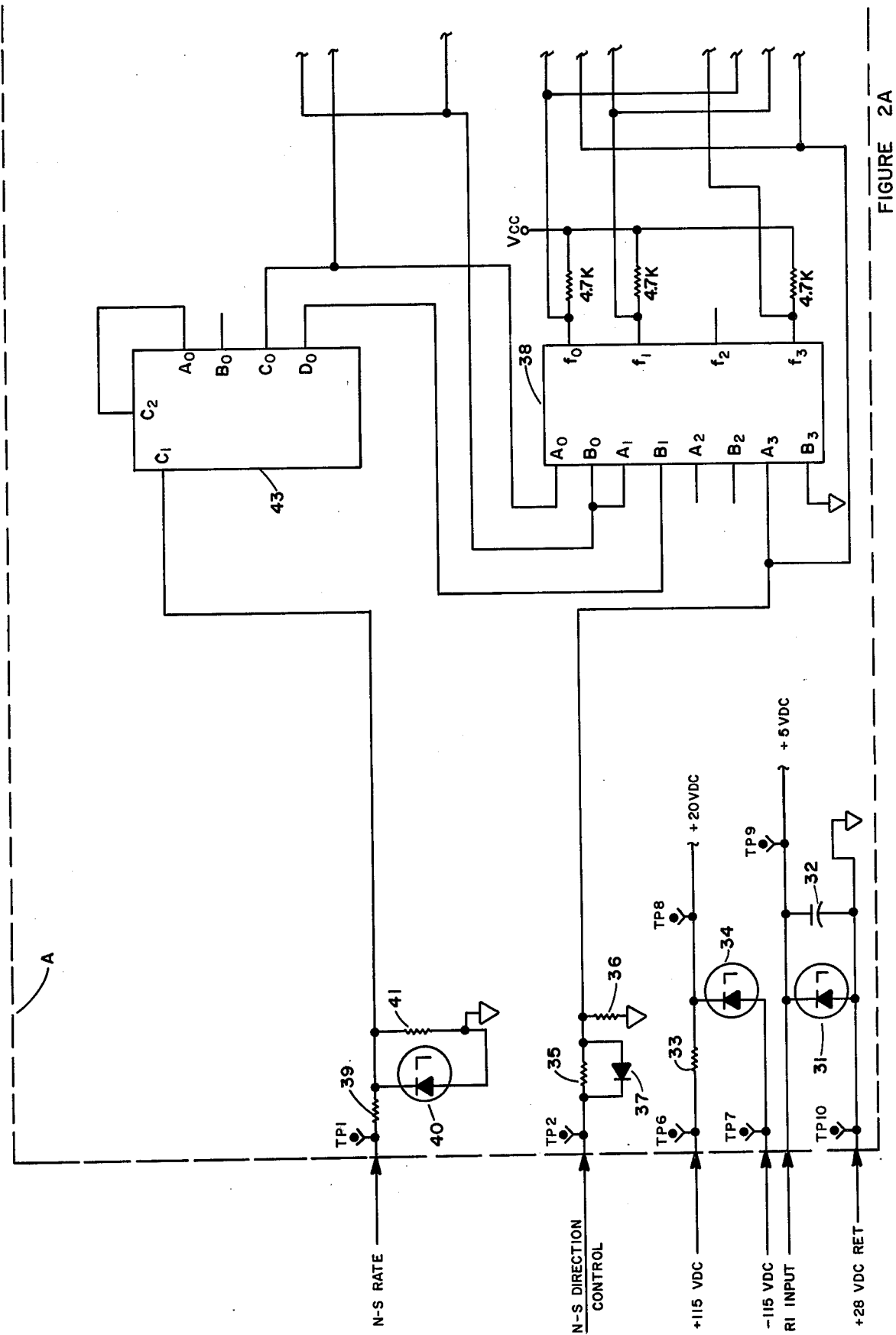
FIGS. 2A and 2B is a circuit diagram of channel A.
Figure 2B:
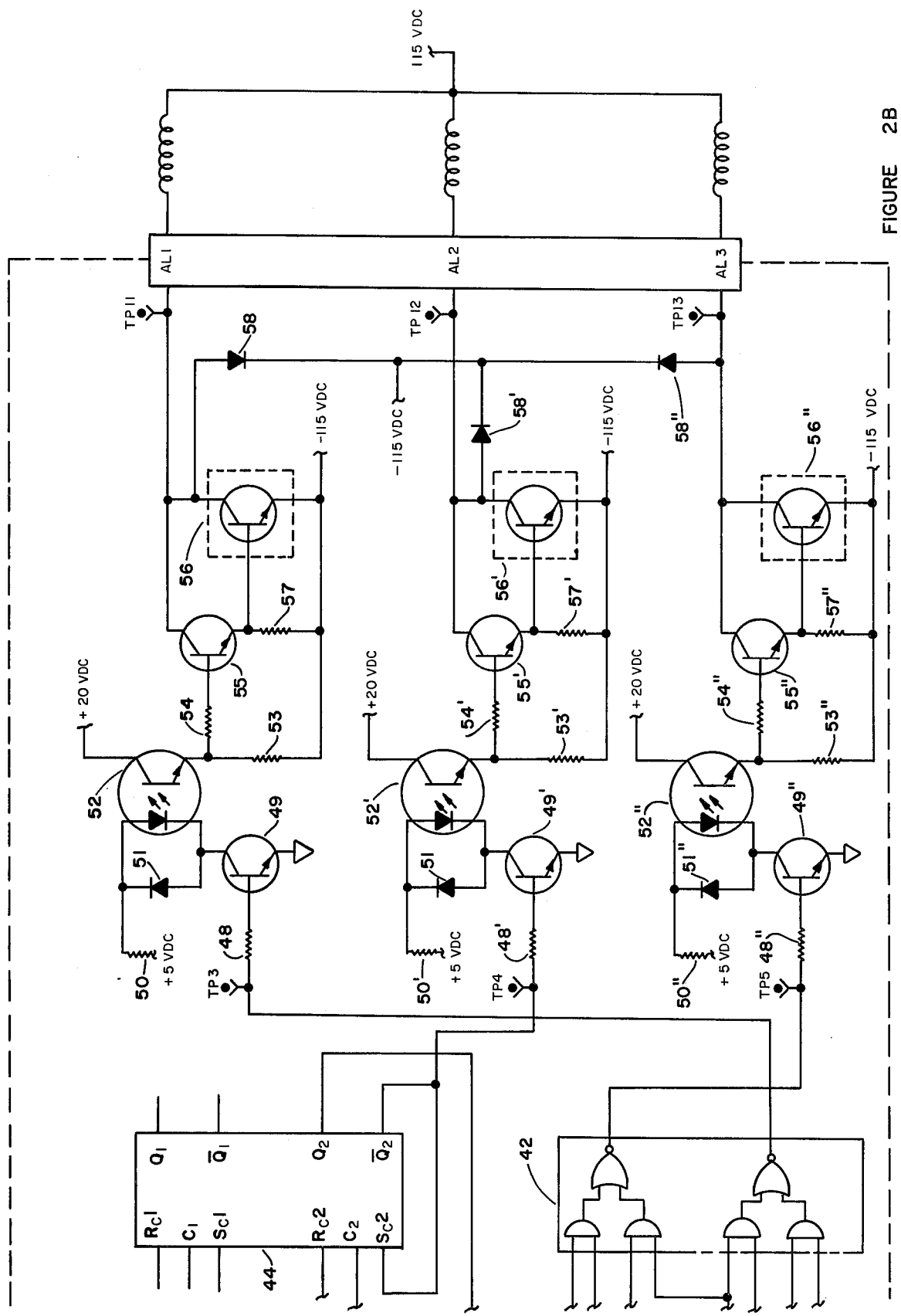

Referring now to FIG. 2, the circuit depicted is channel A, however, channel B is identical thereto and is not shown. Resistor R1 (from FIG. 1), JANIN 3995A diode 31, and 35 volt, 100uf capacitor 32 form a voltage regulated +5VDC output from the +28VDC input. The common return connection, shown on the drawings as a triangle, is the +28VDC return. Various test points are indicated by the letters TP.

A 8.2K ohm 2W resistor 33 and JANIN968 diode 34 form a voltage regulator which provides a regulated +20VDC output from the +115VDC input.

A 6.8K ohm, 1W resistor 35 and a 1K ohm, 2W resistor 36 form a voltage divider network which drops the N-S Direction Control input from a +28V level to a +5V level for north; JANIN2069 diode 37 shorts resistor 35 for south (0 volts). This allows current sinking for comparator 38 operation.

A JANIN3995A diode 40 and 1.5K ohm, 1 watt resistors 39 and 41 form a regulated voltage divider network which drops the N-S square wave pulse train input from a +28V level to a +5V level.

Figure 3:
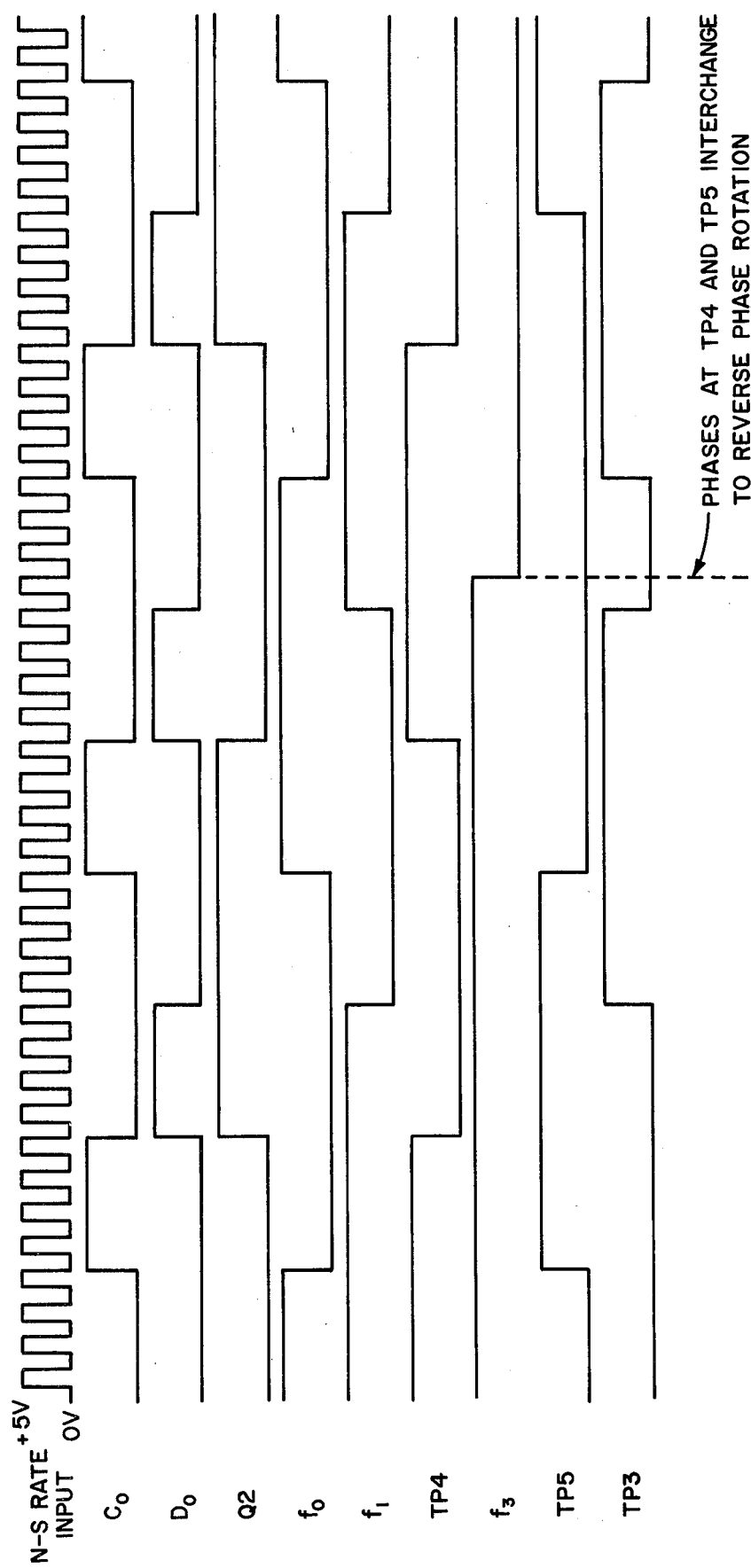
FIG. 3 is a divide by 24/ three phase generator logic timing diagram.

A TTL 8242 quad-digital comparator 38, a TTL 8440 dual AND/OR invert gate 42, a TTL 8288 divide by 12 counter/storage element 43 and a TTL 8424 dual RS/T binary flip-flop 44 comprise the logic circuitry for a modified three phase square wave generator. The power to the logic circuitry is +5VDC. The resulting outputs read at TP3, TP4 and TP5 are three individual +5V square waves phased 120° apart with each of these square waves having a frequency equal to 1/24th that of the input pulse train. FIG. 3 illustrates the timing sequence between the input and outputs with a direction control signal of +5VDC. When the direction control signal of 0VDC is applied to gate 38, outputs at TP3 and TP5 are inverted.

A 6.8K ohm, ¼ W resistor 48, a JAN2N2222A transistor 49, a 150 ohm, ½ W resistor 50, JANIN458A diode 51 and TIL108 optical isolator, light emitting diode coupler 52 constitute an isolation network which isolates the logic circuitry from the output driver network. A 5V pulse at TP3 will turn transistor 49 "on"; transistor 49, acting as a switch, activates the optical coupler 52 by providing a current path to the +28V RET.

A ½ W, 27K ohm resistor 53, a ½ W, 3.3K ohm resistor 54 and a JAN2N3440 transistor 55 form a driver network used to switch JAN293442 transistor 56 "on and off".

A ½ W, 470 ohm resistor 57 and transistor 56 constitute a switching network which, when "on", provides circuit continuity from −115 VDC to output AL1.

JAN1N1124A diode 58 is used to prevent voltages greater than +115 VDC from inductive transients, being impressed across transistor 56.

Circuit explanation for the "prime" network from TP4 to output AL2 is identical to that for the network from TP3 to output AL1 above. Similarly for the "double prime" network from TP5 to output AL3.

Lamps 60, 61 and 62, and switch 63 comprise the N-S output test circuit. (See FIG. 1.) With switch 63 closed and transistor 56 switched "on", lamp 60 has 115 VDC impressed across it causing the lamp to light. Lamps 61 and 62 operate similarly. JAN1N645 blocking diodes 64 and 65 prevent current paths from a connected external load from causing the lamps to light out of sequence.

For channel B, lamps 66, 67 and 68, and switch 69, along with diodes 70 and 71 act in the identical manner as do those in channel A.

The SSST generates a N-S Step Output which will be three 115V peak to peak square wave signals displaced by 120° with respect to each other. These three square wave signals have a variable frequency weighted at 750 pulses/nautical mile. FIG. 4 is a timing sequence diagram illustrating the relationship between the inputs and outputs of the SSST. The same is true for the E-W channel.

Obviously many modifications and variations of the present invention are possible in the light of the above teachings. It is therefore to be understood that within the scope of the appended claims the invention may be practiced otherwise than as specifically described.

What is claimed is:

1. A Solid State Step Transmitter which converts two single-phase digital data pulse trains into two three-phase digital electrical signals representing distance traveled comprising:
    a pair of channels, each including: a single-phase digital data pulse train rate signal; and a two-state directional control signal;
    voltage regulating means which develop the voltages operating the SSST; and
    a pair of solid state three-phase square wave generators each receiving said rate and control signals from one channel and each outputting three individual square-waves displaced by 120° with respect to each other and representative of distance traveled.

2. The device of claim 1 including for each of the three generator outputs of each channel a driver network;
    an isolation network optically coupling said generator to said driver network; and
    a switching network driven on or off by said driver network and when driven on, said switching network provides circuit continuity to its SSST output.

3. The device of claim 2 wherein said solid state three phase square wave generator comprises:
    a divide by 12 counter which receives said rate signal and divides it by 12 and which has a first output leading a second output by four pulses of said rate signal;
    a flip-flop which receives the first output of said counter thereby dividing it by 2 and outputting true and not true signals and wherein the not true output is one of said generator output square waves;
    three exclusive NOR gates wherein the true output of said flip-flop and the first output of said counter are compared by said first exclusive NOR gate and wherein the true output of said flip-flop and the second output of said counter are compared by said second exclusive NOR gate, and wherein said directional control signal and ground are compared by said third exclusive NOR gate; and
    two AND/OR inverters wherein each inverter comprises two AND gates and a NOR gate wherein the outputs of the AND gates are the inputs of the NOR gate and said first inverter has the output of said first exclusive NOR gate AND-ed to said directional control signal and has the output of said second exclusive NOR gate AND-ed to the output of said third exclusive NOR gate, and said second inverter has the output of said first exclusive NOR gate AND-ed to the output of said third exclusive NOR gate and has the output of said second exclusive NOR gate AND-ed to said directional control signal and wherein the output of each inverter is one of said generator output square waves.

4. The device of claim 1 wherein said solid state three phase square wave gbenerator comprises:
    a divide by twelve counter which receives said rate signal and divides it by 12 and which has a first output leading a second output by four pulses of said rate signal;
    a flip-flop which receives the first output of said counter thereby dividing it by 2 and outputting true and not true signals and wherein the not true output is one of said generator output square waves;
    three exclusive NOR gates wherein the true output of said flip-flop and the first output of said counter are compared by said first exclusive NOR gate and wherein the true output of said flip-flop and the second output of said counter are compared by said second exclusive NOR gate, and wherein said directional control signal and ground are compared by said third exclusive NOR gate; and
    two AND/OR inverters wherein each inverter comprises two AND gates and a NOR gate wherein the outputs of the AND gates are the inputs of the NOR gate and said first inverter has the output of said first exclusive NOR gate AND-ed to said directional control signal and has the output of said second exclusive NOR gate AND-ed to the output of said third exclusive NOR gate, and said second inverter has the output of said first exclusive NOR gate AND-ed to the output of said third exclusive NOR gate and has the output of said second exclusive NOR gate AND-ed to said directional control signal and wherein the output of each inverter is one of said generator output square waves.

* * * * *